US012652246B2

(12) United States Patent
Smith

(10) Patent No.: US 12,652,246 B2
(45) Date of Patent: Jun. 9, 2026

(54) CLASSIFICATION ENGINE WITH FIELD REDUCTION FOR ETHERNET ROUTING

(71) Applicant: Tenstorrent USA, Inc., Austin, TX (US)

(72) Inventor: Michael Smith, Toronto (CA)

(73) Assignee: Tenstorrent USA, Inc.

( * ) Notice: Subject to any disclaimer, the term of this patent is extended or adjusted under 35 U.S.C. 154(b) by 0 days.

(21) Appl. No.: 18/929,608

(22) Filed: Oct. 28, 2024

(65) Prior Publication Data

US 2025/0310250 A1 Oct. 2, 2025

Related U.S. Application Data

(60) Provisional application No. 63/572,261, filed on Mar. 30, 2024.

(51) Int. Cl.
 H04L 45/00 (2022.01)
(52) U.S. Cl.
 CPC .................................... H04L 45/66 (2013.01)
(58) Field of Classification Search
 CPC ....................................................... H04L 45/66
 See application file for complete search history.

(56) References Cited

U.S. PATENT DOCUMENTS

| | | |
|---|---|---|
| 5,446,736 A | 8/1995 | Gleeson et al. |
| 2011/0080916 A1 | 4/2011 | Davies et al. |
| 2015/0010000 A1 | 1/2015 | Zhang et al. |
| 2015/0138949 A1 | 5/2015 | Kurogi et al. |
| 2016/0006663 A1* | 1/2016 | Zhang ................... H04L 45/742 |
| | | 709/234 |
| 2019/0238458 A1* | 8/2019 | Pongracz ................ H04L 47/82 |
| 2021/0409335 A1 | 12/2021 | Zhu et al. |
| 2022/0094635 A1* | 3/2022 | Ramsland ............... H04L 45/04 |
| 2024/0356857 A1* | 10/2024 | Williams ................ H04L 47/20 |

OTHER PUBLICATIONS

International Search Report and Written Opinion dated Jun. 17, 2025 from International Application No. PCT/US25/21933, 12 pages.

* cited by examiner

*Primary Examiner* — Donald L Mills

(74) *Attorney, Agent, or Firm* — Daylight Law, P.C.

(57) ABSTRACT

Methods and systems are disclosed for routing packets through a network. A disclosed system for routing an Ethernet packet comprises a field reduction block with combinatorial logic implementing at least one if-else statement for at least one field of the Ethernet packet, and an output of the combinatorial logic of the field reduction block in the form of at least one flag. The combinatorial logic generates the flag for at least two values of the at least one field. The system also comprises a rule table that includes at least one rule based on the at least one flag; and routing logic with access to the rule table for routing the Ethernet packet using a rule with the flag.

20 Claims, 3 Drawing Sheets

300

CLASSIFICATION ENGINE WITH FIELD REDUCTION FOR ETHERNET ROUTING

CROSS-REFERENCE TO RELATED APPLICATIONS

This application claims the benefit of U.S. Provisional Patent Application No. 63/572,261, filed Mar. 30, 2024, which is incorporated by reference herein in its entirety for all purposes.

BACKGROUND

Ethernet has become profoundly pervasive in the modern world, serving as the backbone of virtually all local area networks (LANs) and a significant portion of wide area networks (WANs). From home networks to large-scale corporate infrastructures, Ethernet technology is the cornerstone of connectivity, facilitating the seamless exchange of data across devices and systems. Its versatility, reliability, and cost-effectiveness have led to its widespread adoption across industries, including telecommunications, education, healthcare, finance, and beyond. With its ability to support high-speed data transmission and accommodate various applications, including internet access, Voice over Internet Protocol (VoIP), video streaming, and Internet of Things (IoT) devices, Ethernet has solidified its place as the de facto standard for wired networking worldwide.

Ethernet packets are routed using rules in a rule table through a process known as packet forwarding. In a typical Ethernet network, each device, such as routers or switches, maintains a rule table that specifies how incoming packets should be handled. These rules are based on factors like destination MAC address, VLAN tags, or IP addresses. When a packet arrives at a device, it examines the packet's header information, identifies the fields in the header, and evaluates the values in the fields against the rules in its table. If a match is found, the device forwards the packet according to the corresponding rule, determining which port or interface the packet should be sent out of. This efficient method of routing allows for the seamless transfer of data within Ethernet networks, ensuring that packets reach their intended destinations accurately and swiftly.

SUMMARY

This disclosure relates to routing data packets in packet-based networks, and more specifically to routing Ethernet packets efficiently through a network. The systems include classification engines with reduced rule tables as compared to prior art Ethernet routing systems. The rule tables can be reduced by having fewer entries (i.e., rules) in the table. In specific embodiments, the rule table is reduced in such a manner that it provides the same functionality as a larger routing table. The approaches disclosed herein include an approach called field reduction which enables the reduction of rule tables such that it still provides the same functionality as a larger routing table.

In specific embodiments of the invention, field reduction is conducted by evaluating the fields of an Ethernet packet header using conditional logic in a packet classification pipeline. Chosen values in various fields corresponding to commonly used values can be combined and/or compressed into flag values which can be added to search tuples. Routing or other rule tables can be implemented using ternary content-addressable memory (TCAM) or other types of structures that allows quick search and parallel evaluation for matching of relevant search terms contained in a packet header. Preprocessing of packet header information into flags can allow for rule table reduction. In contrast to prior art approaches where rule table reduction seeks to only manipulate the ruleset to cover the chosen routing space with fewer rules, the use of flags in the rule table in specific embodiments of the invention allows less data to be used in the rule table to route the packets.

Approaches disclosed herein describe creating flags for combining and classifying various types of packet data, including source and destination addresses, Ethernet types, protocols, and source and destination ports. Flags can be created using arbitrary combinatorial logic, which may be implemented directly in logic gates or other structures or may otherwise be implemented using flow tables. Packets can be handled and routed efficiently using these flags. The system also describes facilitation of other functions such as packet statistics, timestamp handling, packet editing, and other applications.

In specific embodiments of the invention, a system for routing an Ethernet packet is provided. The system comprises: a field reduction block with combinatorial logic implementing at least one if-else statement for at least one field of the Ethernet packet; an output of the combinatorial logic of the field reduction block in the form of at least one flag, wherein the combinatorial logic generates the flag for at least two values of the at least one field; a rule table that includes at least one rule based on the at least one flag; and routing logic with access to the rule table for routing the Ethernet packet using a rule with the flag.

In specific embodiments of the invention, a method for routing an Ethernet packet is provided. The method comprises: evaluating a first Ethernet packet using a field reduction block with combinatorial logic, wherein the combinatorial logic implements at least one if-else statement for a field of the first Ethernet packet, wherein the first Ethernet packet has a first value for the field; generating a first output from the combinatorial logic of the field reduction block, based on the first value, in the form of a first flag; evaluating a second Ethernet packet using the field reduction block, wherein the second Ethernet packet has a second value for the field; generating a second output from the combinatorial logic of the field reduction block, based on the second value, in the form of the first flag; routing the first Ethernet packet using a rule table and a rule in the rule table that includes the first flag; and routing the second Ethernet packet using the rule table and the rule based on the first flag.

In specific embodiments of the invention, a method for routing an Ethernet packet is provided. The method comprises: evaluating an Ethernet packet using a field reduction block with combinatorial logic, wherein the Ethernet packet has a first value or a second value for the field; generating an output from the combinatorial logic of the field reduction block, based on the first value or the second value, in the form of a flag, wherein the combinatorial logic is configured to generate the same flag from either the first value or the second value; and routing the Ethernet packet using a rule table and a rule in the rule table that includes the flag, wherein the rule in the rule table uses the flag for routing the Ethernet packet rather than the first value or the second value.

BRIEF DESCRIPTION OF THE DRAWINGS

The accompanying drawings illustrate various embodiments of systems, methods, and various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DESCRIPTION

Figure 1:
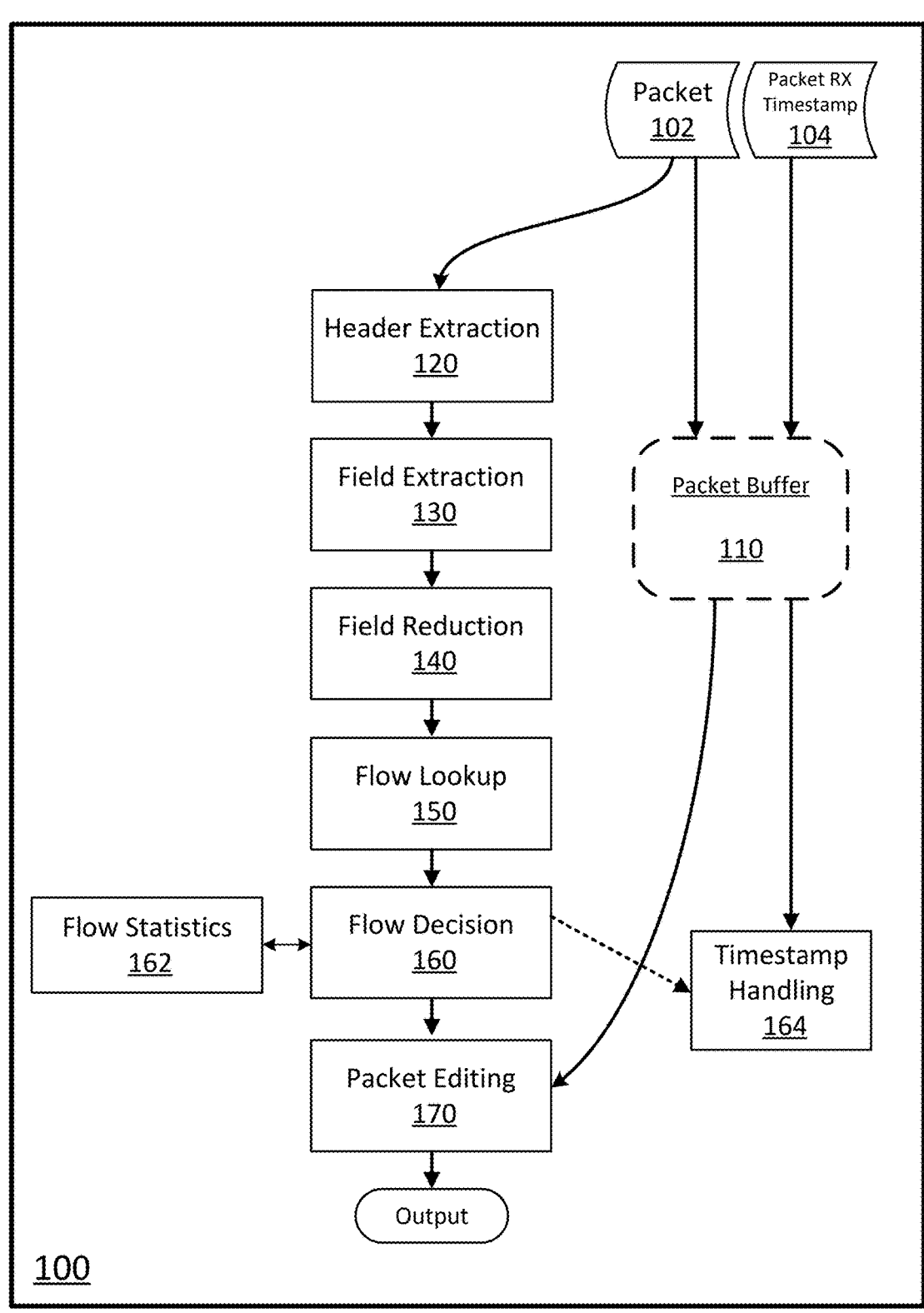
FIG. 1 shows an Ethernet classification pipeline along with a method of using the pipeline that is in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for efficiently classifying and routing Ethernet packets in accordance with the summary above are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Systems and methods related to efficiently routing Ethernet packets are disclosed herein. In specific embodiments, the systems include classification engines with reduced rule tables as compared to prior art Ethernet routing systems. The rule tables can be reduced by having fewer entries (i.e., rules) in the table. In specific embodiments, the rule table is reduced in such a manner that it provides the same functionality as a larger routing table. The approaches disclosed herein include an approach called field reduction which enables the reduction of rule tables such that it still provides the same functionality as a larger routing table.

In specific embodiments, the rule table for an Ethernet routing system is stored in ternary content-addressable memory (TCAM) which requires significantly more area to store values than a conventional memory, but has an advantage in that all entries in the rule table can be checked in parallel, which speeds up searching. As TCAMs are not efficient storage devices, it is advantageous to reduce the size of the table. Additionally, regardless of the data structure in which the rule table is stored, fewer entries in the rule table means that less software overhead is required to manage the table. Moreover, since TCAMs use significantly more power than conventional memory, fewer entries in the rule table can allow the use of a smaller TCAM size or alternatively allow for selective activation of portions of the TCAM. Accordingly, using the field reduction approaches disclosed herein, Ethernet routing systems can be more efficient than those in prior art systems.

In specific embodiments, field reduction is conducted by evaluating the fields of an Ethernet packet header using conditional logic. The step of evaluating the fields of the Ethernet packet for purposes of field reduction can be conducted combinatorially using logic circuits. Accordingly, the step can be conducted as part of an Ethernet packet processing pipeline in less than a single clock cycle. In specific embodiments, the step of evaluating the fields of the Ethernet packet for purposes of field reduction can be conducted using if-else statements. The conditional logic can evaluate the fields of the header and identify if the fields have certain values. The layers of conditional logic can include a set of if-else statements for each field in the header of an Ethernet packet. The sets of if-else statements can include one if statement in each of those if-else statements for each potential value of the field. In specific embodiments, the number of if-else statements is limited to the fields that are being used to reduce the field table. The conditional logic can be designed ex ante with specific rule reduction schemes in mind. The conditional logic can be hard coded to evaluate specific fields for specific values. In alternative embodiments, the conditional logic can be in firmware and can be software configurable to adjust to different rule reduction schemes.

In specific embodiments, the field reduction process involves taking various actions in response to detecting that a given field has a given value. As such, the process can involve a step of taking an action in response to the evaluating of the field values. For example, determining that a given field has a given value could result in throwing a flag. The field reduction process could consist essentially of the step of taking the action and the step of evaluating the fields. Multiple values for multiple fields could be mapped to different flags from a set of flags for this purpose. The mapping could be encoded into the conditional logic (i.e., the action of the if statements could be to throw the flag associated with the field-value pair that caused the if statement to be true). Accordingly, the same combinatorial logic that was used to evaluate the fields could be used to throw the flags with the output of a set of logic gates being equated with the flags (e.g., if the output of logic gate A is a "1" then throw flag "A"). The number of potential flags can be less than the number of values of the fields that are used in a reduction scheme as multiple field-number pairs could be mapped to the same flag.

In specific embodiments, the flags could be stored in registers that are dedicated to specific flags. The registers could be accessed with respect to the remainder of the system such that they are associated with the packet that caused the flag to be thrown. The dedicated registers can be stored in a data structure that is associated with the rule table. A given packet can be evaluated with reference to the rule table and a set of dedicated registers that have been used to store the flags for that specific packet. In alternative embodiments, the flags can be stored in latches that latch the values at the end of a first clock cycle when the field evaluation is completed, and those latched values are then made available in the following clock cycle to determine how to route a given packet (i.e., they are immediately used in the next clock cycle in combination with the rule table to determine how a packet should be routed). The latched values could also be buffered to account for differences in the processing of the field evaluation steps and the following steps in the pipeline.

In specific embodiments of the invention, at least two different field-value combinations will result in a common flag value for a packet. For example, if an L3_Protocol field of a packet had a value of 0x06 (indicating that the packet was using a transmission control protocol (TCP) protocol) and an L3_Protocol field of a different packet had a value of 0x11 (indicating that the packet was using a user datagram protocol (UDP) protocol), the step of field reduction for each of those packets could involve identifying both of those values and throwing the same flag in response. An example of combinatorial logic for these situations could be combinatorial logic which instantiates the pseudo code: if (field==1 or field==2 or field==3) then flagA=1; else flagA=0. In this expression, flagA is the shared flag and the values of 1, 2, or 3 for the field are the values that share the flag. Another example of combinatorial logic for these situations could be combinatorial logic which instantiates the pseudo code: if (field_1==X or field_2==Y) flagB=1; else flagB=0. In this expression flagB is the shared flag and the field-value pairs which share the flag are field_1:X and field_2:Y. Combinatorial logic can be arbitrarily complex, and in specific embodiments can be organized in a sequential or branching tree pipeline structure. In specific embodiments, combinatorial logic can be implemented using flow tables for various fields. Flow tables may be implemented separately for each type of input. For example, one flow table can map a certain set of Protocol flags tied to one or more combinations of L3_Protocols detected in the packet header, while a separate flow table can map a set of Port flags to designated input and/or output ports based on specific ports or port ranges specified. In specific embodiments, different types of fields could be combined into a single flow table to implement various elements of the combinatorial logic described previously.

In contrast to prior art approaches, in specific embodiments, the rule table can be designed to reference the values for the flags instead of the values for the fields of a given packet. The evaluation of the flags can be done in a flow lookup step which accesses the rule table to determine how a packet should be routed. For example, the flow lookup can determine if the packet needs to be routed through a security check before it is routed to its final destination or determine that the packet needs to be routed with higher priority than other packets in the system. The flow lookup step can be conducted in multiple clock cycles (e.g., 3 clock cycles) but could also be accomplished quicker with a parallel implementation. The flow lookup can access the flags, conduct an independent analysis of the fields, and can evaluate other information regarding the packet. Alternatively, the flow lookup could just access the flags and make routing decisions based on that. In some cases, both the flags as well as individual fields can be evaluated simultaneously as part of the rule table search for determining routing decisions.

FIG. 1 is a block diagram showing an Ethernet classification pipeline 100 in accordance with specific embodiments of the inventions disclosed herein. Portions of the pipeline include a header extraction module 120, a field extraction module 130, a field reduction module 140, a flow lookup module 150, a flow decision module 160, and other optional portions. The process of using the pipeline begins with the receipt of a packet 102 and a receive (Rx) time-stamp 104 from a store and forward buffer. In an example, the timestamp 104 is a 64-bit datum, and the packet 102 is a 768-bit packet. The packet can be stored in a packet buffer 110 which in this case includes a 768-bit wide first in, first out (FIFO) buffer for the packets and a 64-bit wide FIFO buffer for the timestamp.

The packet data can be sent to the pipeline. The steps conducted by the pipeline can be configured to take one or more clock cycles to implement or may be conducted with other steps in a single clock cycle. In header extraction module 120, the header is extracted from the packet. In field extraction module 130, the fields are extracted from the header. This step can be conducted in accordance with ex ante knowledge of the makeup of Ethernet packets.

Fields extracted from the header can be sent to field reduction module 140, where the field reduction strategies discussed above are executed. In specific embodiments, some or all the field reduction steps can be implemented in a serial order. In specific embodiments, some or all the field reduction steps can be implemented in parallel. Note that flags generated do not need to be explicitly added to the packet header to be used in the subsequent flow lookup step. Extracted fields can be assembled into a search tuple that can be used to compare with a rule table. Based on the field reduction, flags can be generated as described previously and added to the search tuple.

Flags generated as well as extracted header fields can then be sent to flow lookup module 150, where the flags generated in the field reduction step can be used in a flow lookup step which accesses the rule table using the flags, and optionally the field data itself also, to determine how the packet should be routed. This step can involve accessing the rule table with the flags generated in the field reduction step. In flow decision module 160, a flow decision is made by using the value obtained from the rules table to route the packet. Optionally, flow statistics module 162 can track various statistics of each packet based on instructions from the flow decision module 160. The timestamp handling module 164 can be instructed to drop, store, or otherwise edit input timestamp data. The timestamp handling can involve updating the values in the buffer storing the time-stamps to account for information gleaned from the packets using the flow decision such that specific packets should be prioritized over others. Depending on the flow decision, packet editing module 170 can edit the packets by changing information in either the header or the payload of the packet, if needed, before the packet is routed to a desired output.

In specific embodiments, the field reduction module 140 can include specific flags for commonly used functions. In one example, the L2 destination address (L2_DA) can be examined for particular values, representing an EtherType of Internet Protocol version 4 (IPV4) or Internet Protocol version 6 (IPv6). In this case, a flag L3_is_IP can be set to 1, otherwise L3_is_IP can be set to 0. If L3_is_IP==1, then the L3_Protocol can be checked to see if the protocol chosen is TCP or UDP. In these cases, the flags L4_is_TCP or L4_is_UDP can be set to 1 respectively, otherwise they would be set to 0. These flags can be included in a TCAM search tuple or can otherwise be used to direct the search. For example, if L3_is_IP==1, then the search tuple could include fields geared to routing an IP packet, including source address, destination address, source port, destination port, protocol, and field reduction flags, where the source and destination addresses could be IPv4 or IPV6 addresses.

Non-IP tuples could instead include source and destination MAC addresses along with other field reduction flags.

In specific embodiments, the field reduction module 140 can include flags for chosen groupings of elements. In one example, for non-IP traffic using MAC destination addresses, specific groups of MAC addresses can be grouped together with flags so that the routing table treats them similarly later in the flow decision module 160. Similarly, groups of MAC source addresses could be assigned the same non-zero flag number to be routed similarly. For instance, if three different EtherTypes were to be routed in the same manner, the flagged group would only require one entry in a TCAM routing rule table instead of three separate entries.

Figure 2:
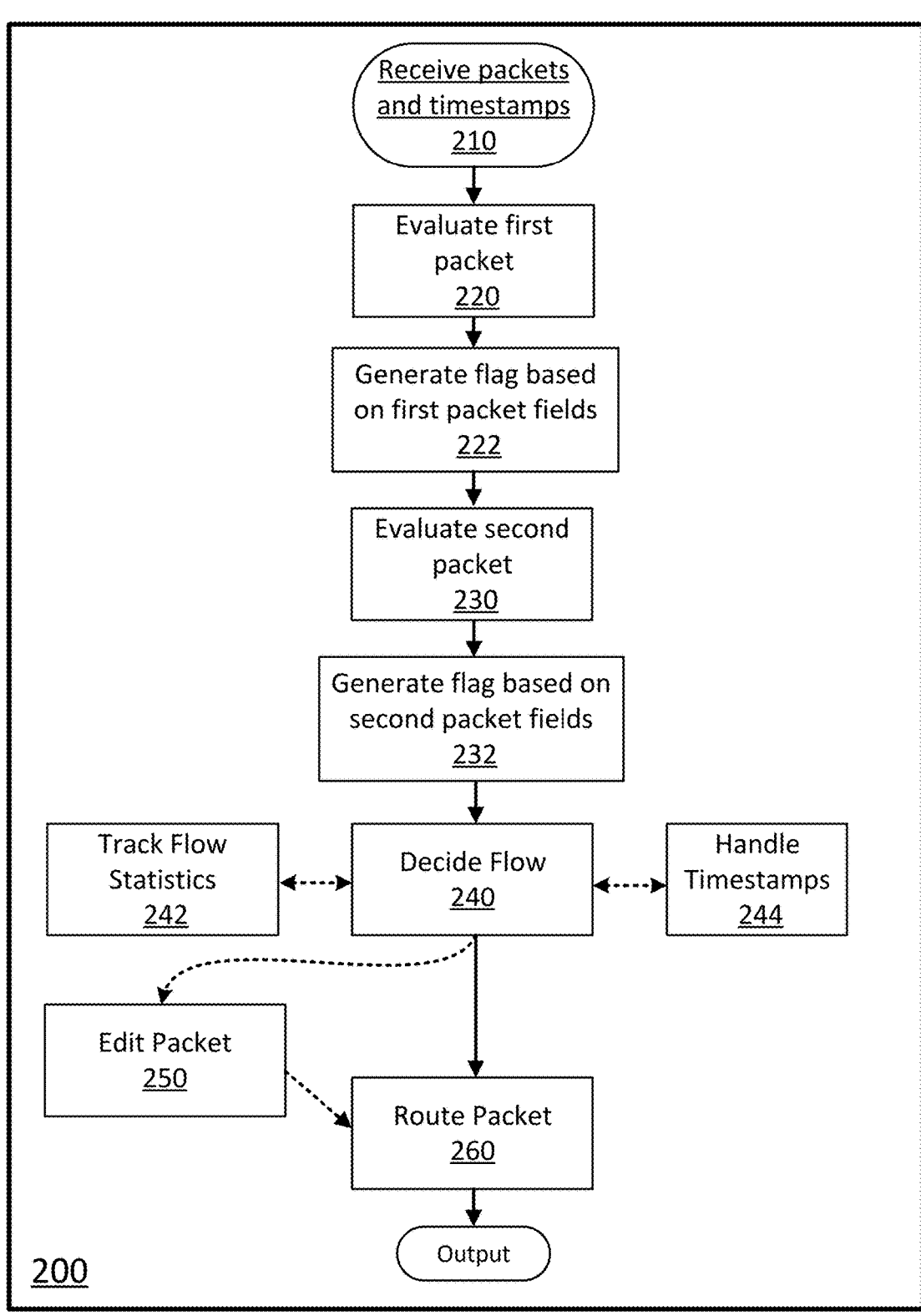
FIG. 2 shows a process for classifying Ethernet packets in accordance with specific embodiments of the inventions disclosed herein.

FIG. 2 shows a flow chart 200 of a process of classifying and routing Ethernet packets in accordance with specific embodiments of the inventions disclosed herein. The process can use a processing pipeline as described with regards to FIG. 1. The process begins in step 210 with the receipt of at least two packets and receive (Rx) timestamps. In step 220, a first packet is evaluated for field reduction. Header information from the first packet can be extracted. This step can be conducted in accordance with ex ante knowledge of the makeup of Ethernet packets. In step 222, field reduction strategies discussed above are executed, and at least one flag is generated based on field values. In specific embodiments, some or all the field reduction steps can be implemented in a serial order. In specific embodiments, some or all the field reduction steps can be implemented in parallel. Note that flags generated do not need to be explicitly added to the packet header to be used in the subsequent flow lookup step. Extracted fields can be assembled into a search tuple that can be used to compare with a rule table. Based on the field reduction, flags can be generated as described previously and added to the search tuple. Steps 230 and 232 evaluate the second packet and generate one or more flags based on the second packet fields in a manner similar to that described for steps 220 and 222. In some cases, the first packet may have a value in a field that is different from the value in the same field of the second packet. However, based on the combinatorial logic, the same flag can be generated for both packets.

In step 240, the flags generated in the field reduction step can be used in to decide the flow of the packet. In this step, the rule table is accessed using the flags added to a search tuple, and optionally the field data itself also, to determine how the packet should be routed. In the case where a flag is the same for two different packets (even if one or more field values are different between packets) the flow may be the same for both packets. In step 260, the packets can be routed using the value obtained from the rules table to route the packet. Optionally, in step 242, flow statistics can be tracked based on the flow decision from step 240 or other parameters listed in the rule table. Optionally, in step 244, timestamps can be handled. The timestamp handling can involve updating the values in the buffer storing the timestamps to account for information gleaned from the packets using the flow decision such that specific packets should be prioritized over others. Depending on the flow decision, packet editing can be conducted in step 250 if desired or required prior to routing.

Figure 3:
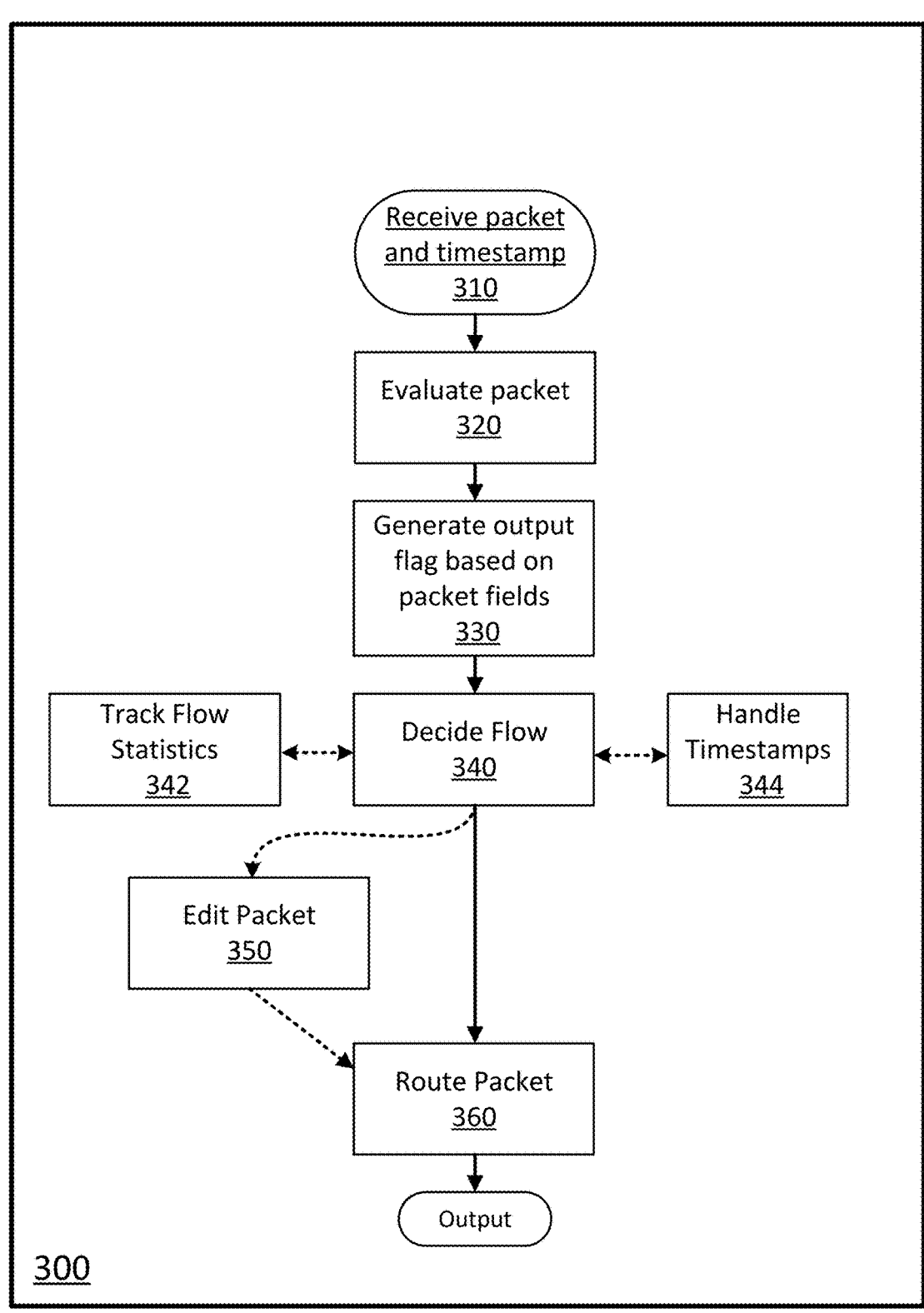
FIG. 3 shows a process for classifying Ethernet packets in accordance with specific embodiments of the inventions disclosed herein.

FIG. 3 shows a flow chart 300 of a process of classifying and routing Ethernet packets in accordance with specific embodiments of the inventions disclosed herein. The process can use a processing pipeline as described with regard to FIG. 1. The process begins at step 310 with the receipt of a packet and a receive (Rx) timestamp. In step 320, the packet is evaluated for field reduction. Header information from the packet can be extracted. This step can be conducted in accordance with ex ante knowledge of the makeup of Ethernet packets. In step 330, field reduction strategies discussed above are executed, and at least one flag is generated based on field values. In specific embodiments, some or all the field reduction steps can be implemented in a serial order. In specific embodiments, some or all the field reduction steps can be implemented in parallel. Note that flags generated do not need to be explicitly added to the packet header to be used in the subsequent flow lookup step. Extracted fields can be assembled into a search tuple that can be used to compare with a rule table. Based on the field reduction, flags can be generated as described previously and added to the search tuple.

In step 340, the flags generated in the field reduction step can be used to decide the flow of the packet. In this step, the rule table is accessed using the flags added to a search tuple, and optionally the field data itself also, to determine how the packet should be routed. In the case where a flag is the same for two different field values, the flow may be the same for the packet. In step 360, the packets can be routed using the value obtained from the rules table to route the packet. Optionally, in step 342, flow statistics can be tracked based on the flow decision in step 340 or other parameters listed in the rule table. Optionally, in step 344, the timestamp can be handled. The timestamp handling can involve updating the values in the buffer storing the timestamps to account for information gleaned from the packets using the flow decision such that specific packets should be prioritized over others. Depending on the flow decision, packet editing step 350 can be conducted if required or desired prior to routing.

In various following examples, field reduction flags can be set for selected groupings of parameters, such as known EtherTypes for a packet. The field reduction step can involve comparing a particular field with specific values and throwing flags based on the specific values. In particular, the step can include throwing the same flag for multiple values of a given field or for multiple field-value pairs. Table 1 shows a portion of an EtherType flag table. In this example, the FR_EtherType flag is selected to be a 4-bit number, where the value 0 for a particular FE_EtherType designates that the TCAM rule table will not use specific flag values for the EtherType for routing decisions but may instead use directly use the FE_EtherType field. Alternatively, FE_EtherTypes could be omitted from the table and in the field reduction module 140 have its EtherType flag be set to 0 by default. Multiple EtherTypes can be set to the same flag where the rule table can be set up to route them properly with fewer rules. The Meaning column is for illustrative purposes and need not be included in any flag tables.

TABLE 1

| Portion of an example EtherType flag table | | |
|---|---|---|
| FE_EtherType | Meaning | FR_EtherType.Flags |
| <0x0600 | 802.3 Length Indication | 0 |
| 0x0800 | IPv4 | 1 |
| 0x86DD | IPv6 | 1 |
| 0x0806 | ARP | 2 |
| 0x8035 | RARP | 2 |
| 0x0842 | Wake-on-LAN | 0 |
| 0x8902 | 802.1 CFM | 0 |
| 0x22E7 | DCB Congestion Message | 0 |
| . . . | . . . | . . . |

In another example, Table 2 shows a portion of a Protocol flag table. Herein, L3_Protocol 0x02, corresponding to IGMP, as well as other protocols not shown here or included in the table, may have a Protocol flag set to 0. The routing table may be set up to route ICMP and ICMP for IPV6 similarly, so they are assigned a Protocol Flag of 1, and TCP and UDP could be similarly assigned to a Protocol flag of 2. The values for the L3_Protocol flags can be programmatically assigned by users when configuring a given Ethernet routing system or hardcoded into the system. The number of bits assigned to each flag field is arbitrary and can be selected based on the size of the TCAM or other routing needs. Flags for different fields are independent from one another unless the combinatorial logic is explicitly combined. For instance, in specific embodiments, Tables 1 and 2 could be combined into a single table where EtherType and Protocol could be combined with a single set of flags.

TABLE 2

| Portion of an example Protocol flag table | | |
| --- | --- | --- |
| L3_Protocol | Meaning | FR_L3_Protocol.Flags |
| 0x01 | ICMP | 1 |
| 0x02 | IGMP | 0 |
| 0x06 | TCP | 2 |
| 0x11 | UDP | 2 |
| 0x3A | ICMP for IPv6 | 1 |
| . . . | . . . | . . . |

In another example, Table 3 shows a portion of a Port flag table. Flags for ports can be described differently than for other parameters and may also be represented more efficiently. In common use, port ranges can be specified in a TCAM table using prefix matching over ranges. Prefix matching can be represented minimally when used for other purposes, such as rule matching a range within, e.g., an IPV4 subblock such as 192.168.1.*. TCAM entries can use specific matching as well as wild card matching on a bit level, which maps well to the well-structured binary equivalent of an IP address or address range. However, port ranges are often chosen using decimal ranges that are arbitrary and may not map well to binary structure. The example in Table 3 for Overlay Flows describes port range 2400-2500. In a standard TCAM table, this would require up to four separate prefix entries to match the entire range. Additional entries would be needed if other ports or port ranges were routed to in the same manner. In general, a particular set of 16-bit port ranges could be represented by anywhere from one to thirty different prefix entries. By setting a single flag to one or more ranges, one TCAM entry can match an arbitrary set of ranges.

TABLE 3

| Portion of an example Port flag table | | | | | | |
| --- | --- | --- | --- | --- | --- | --- |
| Meaning | TCP | Dest | Range | Port0 | Port1 | Flags |
| Typical HTTP Traffic | 1 | 1 | 0 | 80 | 8080 | 1 |
| VNC | 1 | 1 | 1 | 5900 | 5910 | 2 |
| PTP UDP | 0 | 1 | 0 | 320 | 320 | 1 |
| Overlay Flows | 0 | 1 | 1 | 2400 | 2500 | 3 |
| . . . | . . . | . . . | . . . | . . . | . . . | . . . |

The example of Table 3 shows one method of creating port flags, but other layouts could be used that allow for one or more sets of single or multiple ports to be assigned a particular flag value. In this table, TCP or non-TCP port ranges can be set in the TCP column. The Dest column can be used to track whether the port range corresponds to a source or destination port. Port0 and Port1 refer to two separate port numbers (or alternatively the same port number if only one is desired). The Range column can be set to 1 to designate whether the range described is an inclusive range between and including Port0 and Port1, or set to 0 if only the Port0 and possibly Port1 numbers should be used. In the field reduction module 140, the packet data on the source and destination ports can be compared to the Port flag table to determine if any flags should be set for the Port flags. In specific embodiments, source ports and destination ports can each have their own flags in the TCAM search tuple. In this case, the same structure of Port table similar to Table 3 can be used as there is an entry to differentiate between source and destination ports. Alternatively, a separate Port flag table could be utilized for source and destination ports. Prior art applications are known which use various port range encoding techniques to handle arbitrary sets of port ranges that May overlap, but encoding schemes can take up additional space depending on the complexity of the encoding. In contrast, in specific embodiments, port ranges can be selected with non-overlapping ranges for most commonly used ports (e.g., for applications configured to use specific port ranges) that can reduce the overall TCAM size and result in compact flags. Note that this restriction is not absolute based on additional information in the Port flag table. In the example of Table 3, TCP and non-TCP traffic can be treated separately. Thus, TCP traffic can have sets of overlapping ports with non-TCP traffic and still be distinguished and flagged properly for the routing rule table. Similarly, source and destination ports are called out separately, and thus overlapping ranges are permitted as well. In specific embodiments, port ranges in a port flag table can be allowed to overlap within a certain category (e.g., destination ports for TCP traffic) if the table is defined to return the first matched flag in the table. In this manner, a more specific range of ports could return one flag even if that range is fully or partially overlapping with a second range of ports that return a second flag if table ordering is selected accordingly.

In specific embodiments, other flow tables or similar combinatorial logic can be used to set flags for other types of data in the packet header. For instance, IP addresses or ranges of IP addresses can often be represented compactly in a TCAM rule table; in these cases, there would be less need for using flags to represent these fields. But in some cases, sets of non-contiguous source or destination IP addresses could be grouped for similar routing where the addresses do not map simply to compact descriptions. Flags can be set to represent arbitrary ranges or multiple sets of ranges with a single flag. Similar techniques can be used for non-IP traffic such as, for example, ranges of MAC addresses.

The following example will show the operation of an example flow decision module 160 using a flow control rule table without field reduction (Table 4) and then with field reduction (Table 5) using sample data of Tables 1, 2, and 3. Table 4 shows a portion of a flow decision rule table where each row corresponds to an entry. Key search terms are included in the first five columns labeled "Source Address", "Destination Address", "Source Port", "Destination Port", and "Protocol". Other columns may be present to aid in the flow decision process. A "Prirty," or priority, column may be present to select between rules when there is a conflict. TCAM matching can be configured in multiple ways, but can involve an output of all rows that match the search criteria. In specific embodiments, the row can be selected for routing using the priority of the row entry. In specific embodiments, the row can be selected for routing using longest prefix matching. The flow decision rule table can also include additional columns that guide actions to be taken upon selection. For example, a "Q," or quality column, may direct the routing pipeline to treat the packet in accordance with a desired quality of service protocol, a "Drp," or drop, column may direct the routing pipeline to drop the packet instead of forwarding, a "RmHd," or remove header, column may direct the routing pipeline to remove the header before forwarding, a "TS," or timestamp, column may be used to denote whether the timestamp of the packet should be kept, in timestamp handling module 164 for example. Other columns could similarly be used for arbitrary purposes.

Rows 6a-d can be replaced by the single row 4 in Table 5, where Dest. Port flag=3 corresponds to the chosen port range, and the Dest. Port field can be matched to all. Row 5 in Table 5 corresponds to Row 7 of Table 4. This structure gives a great deal of flexibility to code specific rules or exceptions. For instance, Table 5 row 5 shows a Dest. Port within the same range of 2400-2500 that is mapped to Dest. Port Flag 3 in Table 3. If naïve matching was used, a packet corresponding to row 5 in Table 5 would not match directly to row 5, but instead only row 4. However, in specific embodiments, the flow decision-module 160 can be configured to ignore a TCAM entry in a flag field when it is set to 0 (or another specified value). Alternatively, because the rule table of which Table 5 is a part resides in a TCAM structure,

TABLE 4

|  |  |  |  | Portion of an example flow decision rule table | | | | | | |
| --- | --- | --- | --- | --- | --- | --- | --- | --- | --- | --- |
| Row | Source Address | Dest. Address | Src. Port | Dest. Port | Protcl. | Prirty | IQ | Drp | RmHd | Lab | TS |
| 1 | 192.168.2.* | 192.168.2.10 | * | 80 | 6 (TCP) | 1 | 1 | 0 | 0 | 1 | 0 |
| 2 | 192.168.2.* | 192.168.2.10 | * | 8080 | 6 (TCP) | 1 | 1 | 0 | 0 | 1 | 0 |
| 3 | 192.168.2.* | 192.168.2.10 | * | * | 1 (ICMP) | 1 | 1 | 0 | 0 | 1 | 0 |
| 4 | 192.168.2.* | 192.168.2.10 | * | 319 | UDP | 31 | 1 | 0 | 0 | 3 | 1 |
| 5 | 192.168.2.* | 192.168.2.10 | * | 320 | UDP | 31 | 1 | 0 | 0 | 3 | 0 |
| 6a-d | 192.168.2.* | 192.168.2.10 | * | 2400-2500 | UDP | 1 | 0 | 0 | 1 | 4 | 0 |
| 7 | 192.168.2.31 | 192.168.2.10 | 27341 | 2435 | UDP | 31 | 0 | 0 | 1 | 5 | 0 |
| ... | ... | ... | ... | ... | ... | ... | ... | ... | ... | ... | ... |

Examining Table 4, various entries could be combined if flags are generated based on earlier flow tables. Note that row 6 in Table 4 is displayed as one row entry for brevity and clarity, but for full prefix expansion, this would require four separate row entries (referred to as rows 6a-d) to match the destination port range of 2400-2500, corresponding to 2400/11, 2432/10, 2496/14, and 2500/16 in prefix length notation. Reference is also made to Table 5, which in this example is the same table that could replace Table 4 in the TCAM if appropriate field reduction is selected. Rows 1, 2, and 4 in Table 4 are replaced by row 1 in Table 5 through use of Tables 2 and 3. In Table 2, Protocols TCP and UDP are both mapped to Protocol flag 2. In Table 3, ports 80, 8080, and 320 are all mapped to Dest. Port flag 1. Inclusion of Dest. Port flag 1 in row 1 of Table 5 eliminates three lines in the TCAM because the entries for rows 1 and 2 in Table 4 use TCP as a Protocol, and row 4 of Table 4 uses UDP. Another mapping in Table 2 is used where TCP and UDP are each set to Protocol flag 2. In this example, this is needed as TCP has separate port entries for TCP and non-TCP traffic. Row 1 in Table 5 now can have a wildcard matching for both the Dest. Port and the Protocol fields, as these are properly matched using the flag fields. Rows 2 and 3 of Table 5 remain the same as in Table 4.

the Dest. Port Flag field of row 5 in Table 5 could have a value of 0 but have its masking bits set to ignore matching. In both cases, the search tuple would match to both rows 4 and 5, whereupon the higher priority row 5 could be selected for routing.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

What is claimed is:

1. A method for routing Ethernet packets comprising:
   evaluating a first Ethernet packet using a field reduction block with combinatorial logic, wherein the combinatorial logic implements at least one if-else statement for a field of the first Ethernet packet, wherein the first Ethernet packet has a first value for the field;

TABLE 5

|  |  |  |  |  |  |  | Portion of an example flow decision rule table | | |
| --- | --- | --- | --- | --- | --- | --- | --- | --- | --- |
| Row | Source Address | Dest. Address | Src. Port | Dest. Port | Dest. Port | Protcl. Flags | Protcl. | Prirty | Other |
| 1 | 192.168.2.* | 192.168.2.10 | * | 1 | * | 2 | * | 1 | ... |
| 2 | 192.168.2.* | 192.168.2.10 | * | 0 | * | 0 | 1 (ICMP) | 1 | ... |
| 3 | 192.168.2.* | 192.168.2.10 | * | 0 | 319 | 0 | UDP | 31 | ... |
| 4 | 192.168.2.* | 192.168.2.10 | * | 3 | * | 0 | UDP | 1 | ... |
| 5 | 192.168.2.31 | 192.168.2.10 | 27341 | 0 | 2435 | 0 | UDP | 31 | ... |
| ... | ... | ... | ... | ... | ... | ... | ... | ... | ... | generating, based on the first value, a first output from the combinatorial logic of the field reduction block in the form of a first flag;

evaluating a second Ethernet packet using the field reduction block, wherein the second Ethernet packet has a second value for the field;

generating, based on the second value, a second output from the combinatorial logic of the field reduction block in the form of the first flag;

routing the first Ethernet packet using a rule table and a rule in the rule table that includes the first flag; and routing the second Ethernet packet using the rule table and the rule based on the first flag.

2. The method of claim 1, wherein the combinatorial logic implements at least one if-else statement for a field of the second Ethernet packet.

3. The method of claim 1, wherein the combinatorial logic implements at least one flow table for a field of the first Ethernet packet.

4. The method of claim 1, wherein:

the first Ethernet packet has a third value or a fourth value for a second field; and the method further comprises generating, based on the third value or the fourth value, an output from the combinatorial logic of the field reduction block in the form of a second flag, wherein the combinatorial logic is configured to generate the second flag from either the third value or the fourth value; and wherein the rule in the rule table also uses the second flag for routing the first Ethernet packet rather than the third value or the fourth value.

5. The method of claim 1, wherein:

the first Ethernet packet has a third value or a fourth value for a second field;

the combinatorial logic is configured to generate the first flag from either the third value or the fourth value combined with the first value or the second value; and the rule in the rule table uses the first flag for routing the first Ethernet packet rather than the first, second, third, or fourth values.

6. The method of claim 1, wherein the first flag generated based on the first value and generated based on the second value can also be generated by a range of values between the first value and the second value.

7. The method of claim 6, wherein the combinatorial logic of the field reduction block is configured to provide a different value for the first flag when a second range of values is selected, the second range of values comprising a third value, a fourth value, and the values between the third and fourth values.

8. The method of claim 7, wherein the range of values and the second range of values are non-overlapping.

9. The method of claim 1, wherein the rule table includes ternary content-addressable memory.

10. The method of claim 1, wherein the field of the first Ethernet packet is an EtherType field, a protocol field, a source port field, or a destination port field.

11. The method of claim 1, wherein the combinatorial logic generates the first flag by mapping multiple distinct field values of the first Ethernet packet to a single flag value.

12. The method of claim 1, wherein the combinatorial logic comprises conditional logic executed combinatorially within less than a single clock cycle.

13. The method of claim 1, wherein the first flag is stored in a register or latch associated with the first Ethernet packet for use in a subsequent pipeline stage.

14. The method of claim 1, further comprising performing a flow lookup operation using the first flag.

15. The method of claim 1, wherein the first Ethernet packet is routed without re-evaluating an underlying field value of the first Ethernet packet.

16. The method of claim 1, wherein the combinatorial logic is configurable to modify flag mappings based on a selected rule-reduction scheme.

17. The method of claim 1, wherein the first flag is included in a search tuple used to access the rule table.

18. The method of claim 1, wherein one or more portions of the rule table are selectively activated based on a quantity of entries in the rule table.

19. The method of claim 1, wherein the field reduction block generates multiple independent flags corresponding to different packet fields.

20. The method of claim 1, further comprising tracking packet statistics of the first Ethernet packet.

* * * * *